United States Patent
Blankenship et al.

(10) Patent No.: US 6,554,311 B1
(45) Date of Patent: Apr. 29, 2003

(54) STEP PLATE ASSEMBLY FOR PROVIDING A STEP WHILE PRESERVING ACCESS TO THE HITCH BALL OF A HITCH ASSEMBLY

(75) Inventors: Lowell E. Blankenship, Athens, AL (US); Willie L. Dawson, Jr., Madison, AL (US)

(73) Assignee: USA Ramp, Inc, Huntsville, AL (US)

( * ) Notice: Subject to any disclaimer, the term of this patent is extended or adjusted under 35 U.S.C. 154(b) by 0 days.

(21) Appl. No.: 09/657,205

(22) Filed: Sep. 7, 2000

Related U.S. Application Data

(60) Provisional application No. 60/187,462, filed on Mar. 6, 2000.

(51) Int. Cl.⁷ .............................. B60R 3/02; B60D 1/60
(52) U.S. Cl. ..................... 280/507; 280/500; 280/164.1
(58) Field of Search .......................... 296/62; D12/203; 280/163, 164.1, 166, 500, 507, 511, 504

(56) References Cited

U.S. PATENT DOCUMENTS

| | | | | |
|---|---|---|---|---|
| 3,394,947 A | * | 7/1968 | Strube, Sr. | |
| 3,580,613 A | * | 5/1971 | Northrop | 280/500 |
| 3,588,160 A | * | 6/1971 | Reiner | 293/73 |
| 3,610,658 A | * | 10/1971 | Sartori | 280/164 |
| 3,716,254 A | * | 2/1973 | Tarvin | 280/166 |
| 3,779,580 A | * | 12/1973 | Thelen | 280/164 |
| 3,794,345 A | * | 2/1974 | Locke | 280/163 |
| 4,301,953 A | * | 11/1981 | Abbott | 224/42.03 |
| 4,943,076 A | * | 7/1990 | Tripke | 280/166 |
| 5,135,274 A | * | 8/1992 | Dodd | 293/117 |
| 5,803,475 A | * | 9/1998 | Dick | 280/163 |

FOREIGN PATENT DOCUMENTS

JP  4-372434  * 12/1992

* cited by examiner

Primary Examiner—Avraham Lerner
(74) Attorney, Agent, or Firm—Curtis W. Dodd

(57) ABSTRACT

An apparatus for providing a step at the back of a pickup truck if the truck has a receiver hitch for holding a receiver bar. The preferred apparatus has a support structure secured to the tongue of the receiver bar with the hitch ball and nut. A pivot plate and a tread plate are pivotally mounted to the support structure, providing the step when in the horizontal position and allowing access to the hitch ball when in the vertical position.

5 Claims, 3 Drawing Sheets

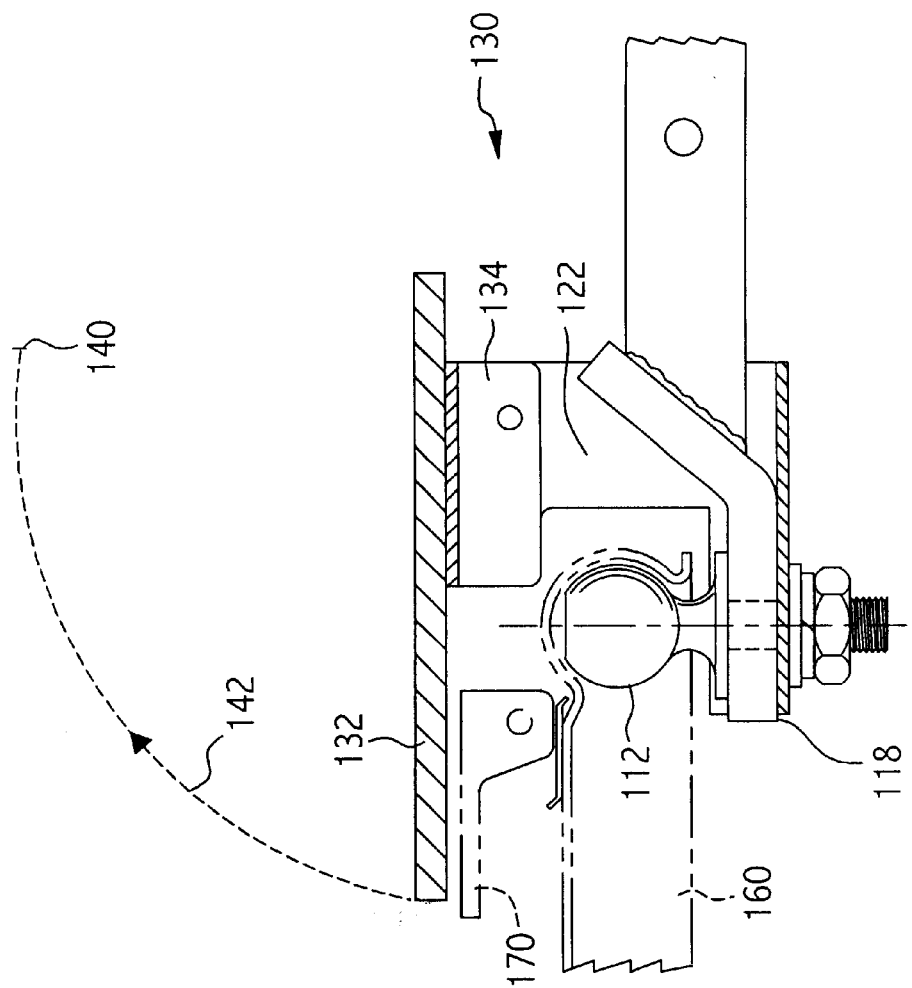
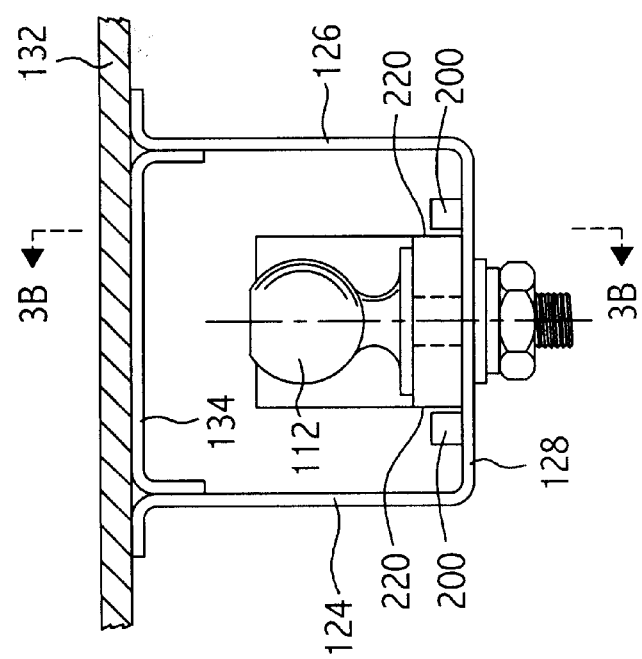
FIG. 3B
FIG. 3A

STEP PLATE ASSEMBLY FOR PROVIDING A STEP WHILE PRESERVING ACCESS TO THE HITCH BALL OF A HITCH ASSEMBLY

CROSS-REFERENCE TO RELATED APPLICATIONS

This application claims priority to U.S. Provisional Application Serial No. 60/187,462 filed on Mar. 6, 2000, having the title "STEP PLATE ASSEMBLY."

FIELD OF THE INVENTION

The present invention relates the hitch bar and hitch ball of a receiver type hitch assembly used on pickup trucks and other vehicles for towing boat trailers and other trailers.

BACKGROUND OF THE INVENTION

Owners of recreational boats typically have a boat trailer for moving the boat from storage to a lake, river or other body of water. Boat trailers are usually towed by a pickup truck or other vehicle to a boat ramp for unloading the boat. When the truck pushes the boat trailer down the boat ramp into the water and after any tie downs and a winch cable from the trailer's winch are released, the boat floats off the trailer and is available for use.

When the boat is loaded to the trailer from the water, the winch cable is attached to the boat and the winch, hand cranked by an operator, pulls the boat onto the trailer. The winch operator, typically not certain of the footing at the boat ramp, typically stands on the tongue of the trailer or the bumper of the truck in order to be in position for operating or turning the handle of the winch. Although neither the tongue of the trailer nor the bumper is a safe place to stand when operating the winch, these somewhat narrow steps are the only steps available. For safety reasons it would be desirable to have a place with better footing to stand when operating the winch. Such a place, a step, should not hinder any of the normal operation of truck the towing apparatus.

In addition to providing a step or a place to stand for the operator of the winch, the step could provide additional benefits. For example the step could provide a place to step from the ground to the bed of the pickup truck or a place to stand when loading items in the bed of the pickup truck.

The present invention uses a receiver hitch ("receiver") and a hitch bar assembly as elements for attaching a step plate assembly or step to vehicles having a receiver. Typically, the hitch bar assembly may support a vertical load of 300 pounds or more and is therefore capable of supporting a step plate assembly in addition to the typical weight of a person standing on a tread plate of the step plate assembly.

The step plate assembly of the present invention includes a support structure, a pivot plate and a tread plate as an integral parts of the hitch bar assembly. The hitch bar assembly is typically installed and pinned into the receiver of a pickup truck or similar vehicle. The hitch bar assembly is typically comprised of a hitch bar with a coupling end and a tongue end where the tongue end has a hole for attaching a hitch ball with washers and a nut. The receiver of a vehicle may be a factory installed option or may be installed at a specialty shop. Hitch bar assemblies are usually available at stores that sell truck and auto parts The present invention adds a step plate assembly to the hitch bar assembly in a novel and cost effective manner.

The problem associated with having a step plate assembly coupled to the hitch bar assembly, and probably the reason such a step plate assembly is not used, is that a step would hinder the removal and attachment of a trailer hitch to the hitch ball. However a step is desirable for when a boat trailer is attached to the hitch ball, since a person using a winch to pull the boat on a trailer needs a suitable place to stand when rotating the crank handle of the winch. Hence a step plate could serve to provide a place for secure footing instead of using the truck bumper or the shaft of a trailer bar. The present invention, the step plate assembly, provides a place to stand and therefore reduces accidents that occur with existing equipment.

There are prior art step plates that attach to the hitch bar of a receiver assembly. However the prior art step plates serve only one purpose, providing a place to stand. If it is desired to use the receiver for another purpose, such as a trailer hitch, a bike rack, a ski rack or the like, the prior art step plate must be removed. There are also many combinations and accessories which are sold to magnify the utility of the receiver, since receivers are a common accessory on many trucks and other vehicles. However, the inventors are not aware of any apparatus or assembly which allows the standard hitch bar to serve as both a trailer hitch and a step. Hence there is a need for a step plate apparatus or assembly that could provide a place to step or stand and in addition could provide access to a hitch ball for pulling a trailer. Further it would be desirable if such an apparatus was easy to install or remove. It would also be desirable if such an apparatus could provide the described functions at a cost less than the cost of purchasing both a hitch assembly and a prior art step plate.

SUMMARY OF THE INVENTION

In view of the needs for an improved apparatus to provide a step and a trailer hitch, one object of the present invention is to replace two assemblies, an individual prior art step plate and an individual trailer hitch, with a step plate assembly that provides both a step and a trailer hitch.

Another object of the present invention is to furnish a step plate assembly that is easy to install on or remove from a traditional hitch bar and has a simple structure, thereby reducing cost.

Yet another object is to provide a step plate assembly that does not hinder the attachment of a trailer or obstruct the movement of a trailer when the trailer is being towed by a vehicle.

The above and other objects are met by a step plate assembly for attachment to a receiver bar of a hitch assembly where the receiver bar has a tongue for holding a hitch ball with a nut and washer. The step plate assembly is comprised of a support frame having a horizontally oriented bottom side with a hole for attachment to a bottom side of the tongue with the nut, the support frame also has a left side and a right side extending vertically upward and perpendicular to the bottom side. The vertical sides may also have flanges extending horizontally and outward to provide support for a tread plate. A pivot plate is pivotally mounted to the left and right side of the support frame using a bolt as pivot pin. A tread plate attached to the pivot plate serves as a surface of a step when horizontally oriented and when the tread plate is rotated upwardly to a vertical position a trailer tongue has access to the hitch ball. Most of the time the tread plate is oriented or positioned horizontally and is only moved to a vertical position when the trailer tongue is attached to or removed from the hitch ball. Notches in the vertical sides of the support frame allow the tongue of the trailer to move from side to side and therefore do not obstruct the movement of the trailer.

An abbreviated description of the present invention indicates that the step assembly is comprised of a support structure having a means for supporting a step plate, where the supporting means provides for the step plate to pivot or rotate between a horizontal position and a vertical position where the step plate is a step when the step plate is in the horizontal position.

It will become apparent upon reading a detailed description and viewing several illustrations that the objects of the present invention are met by the step plate assembly described in the detailed description of the invention.

BRIEF DESCRIPTION OF THE DRAWINGS

The accompanying drawings describe the present invention:

FIG. 3A and 3B illustrates the step plate in a horizontal position for clearance of the tongue of a trailer in accordance with the present invention.

DETAILED DESCRIPTION OF THE INVENTION

Although those skilled in the art could use a variety of materials for fabricating step plate assembly described in the detailed description, the inventors believe that steel having a powder coat after fabrication would be the materials of choice.

Figure 1:
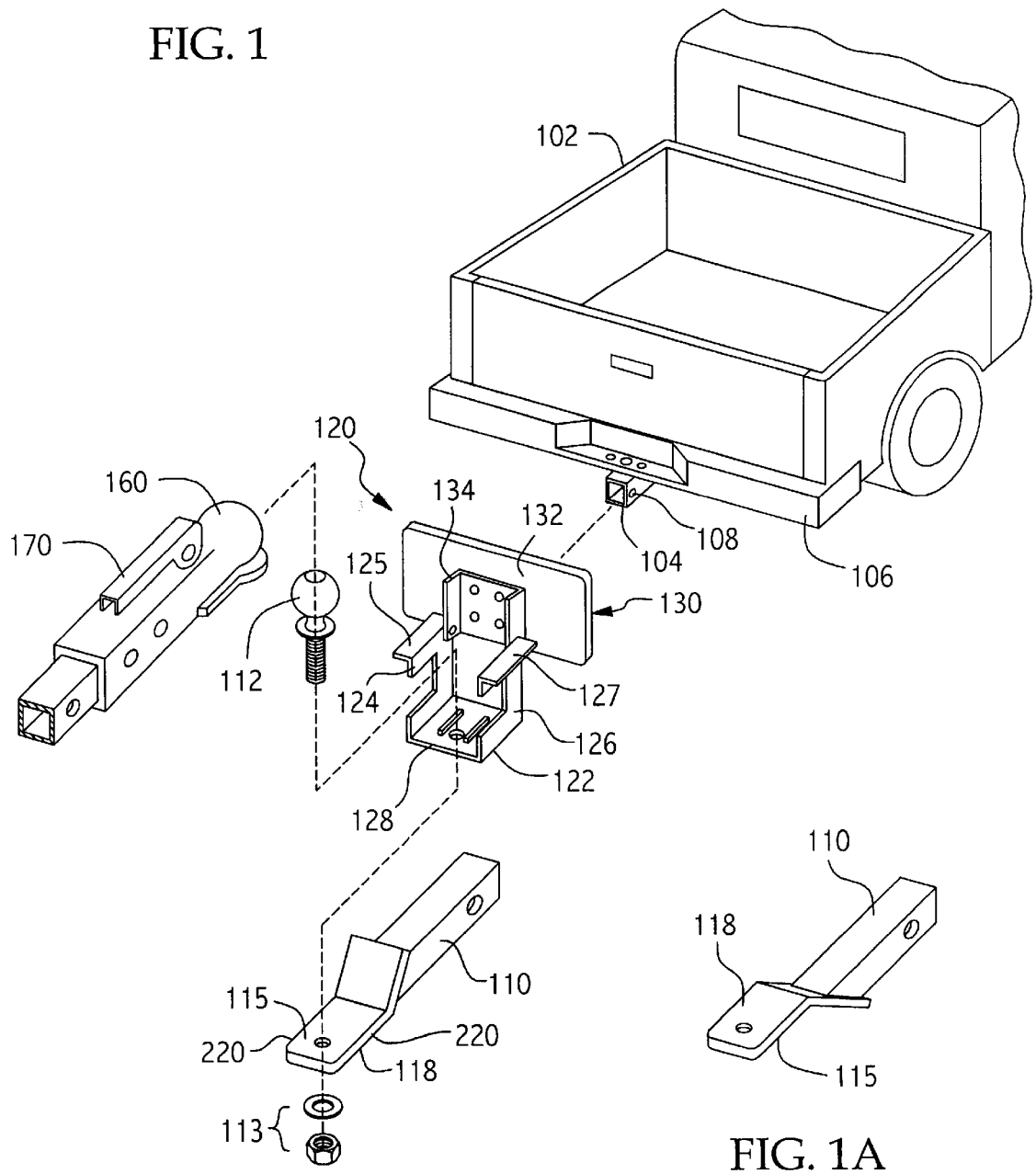
FIG. 1 illustrates the arrangement of elements in accordance with the present invention.

FIG. 1 shows a pickup truck 102 with a receiver hitch 104 ("receiver") located below the rear bumper 106 of the truck. The receiver has an attachment hole 108 for securely pinning a hitch bar 110 into the receiver. A hitch ball 112 is connected to the hitch bar with a nut and washers 113 though a hole in a tongue 115 of the hitch bar. A step plate assembly 120 of the present invention is attached to the hitch bar 110 using the hitch ball 112. The step plate assembly is comprised of a support structure 122 having a left side 124, a right side 126 and a bottom side 128. Notches are cut in the left side and right side of the support structure to provide turning clearance for a trailer hitch 160. Further there may be flanges125 and 127 on the left and right sides of the support structure where the flanges provide support for a tread plate 132. The left side and the right side also have a hole, as will be described, for receiving a pivot pin or a bolt. When the support structure is attached to the hitch bar, the bottom side 118 of the hitch bar tongue 115 is in contact with the top surface of the bottom side 128 of the support structure.

Still referring to FIG. 1 there is shown a plate assembly 130. The plate assembly is comprised of a tread plate 132 and a pivot plate 134. The tread plate is attached to the pivot plate with screws, rivets, or other suitable attachment methods known to those skilled in the art. The pivot plate is dimensioned to fit inside the left and right sides of the support structure 120 when the plate assembly 130 is in a horizontal position. Variation in the fitting of the pivot plate to the support structure would fall within the scope of the present invention. Further, as will be seen more clearly in FIG. 2, the tread plate is positioned vertically when the pivot plate is rotated upwardly to a vertical position.

Figure 2:
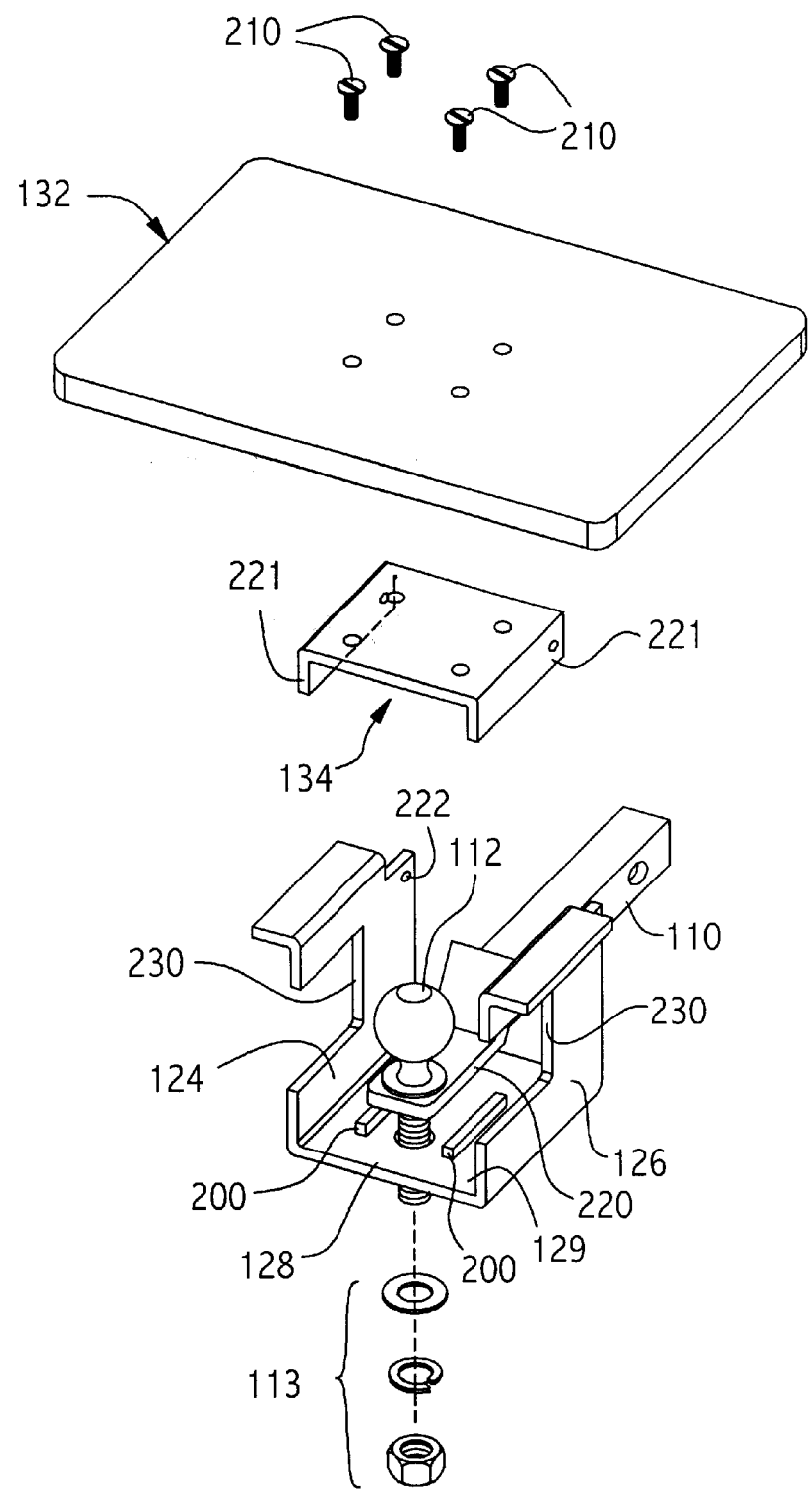
FIG. 2 is a detailed assembly drawing of the present invention.

FIG. 2 is a detailed illustration of the present invention. The support structure 122 has two anti-rotation bars 200 securely attached, such as by welding, to the top surface of the bottom side of the support structure. The anti-rotation bars are positioned and attached to support structure for contact with vertical sides 220 of the receiver tongue 115, thereby keeping the support structure from rotating when the hitch ball is secured to the receiver tongue with the washes and nut 113. Although only one anti-rotational bar could prevent rotation of the support structure two have been chosen for the preferred embodiment. The tread plate 132 having four holes is shown position above the pivot plate 134 with four holes for receiving assembly screws 210 (only one is shown) for attaching the plates together. Pivot holes 220 in the downwardly extending sides of the pivot plate are placed for alignment with pivot holes in the vertical sides 124, 126 of the support frame. A bolt with a non-threaded shoulder is inserted in each pair the pivot holes and serve as pivot pins for the pivot plate. Notches 230 that provide for unobstructed movement of a trailer tongue are cut in the sides 124, 126 of the support structure 122.

FIG. 3A and 3B illustrate the trailer hitch 160 attached to the hitch ball 112 when the tread plate 132 is in a horizontal position. A latching lever 170 on the trailer hitch fits slightly below the bottom side of the tread plate 132. The rotation path 142 to the vertical orientation or position 140 is shown at the top of FIG. 3B.

In summary, the step plate assembly 120 is designed to fit onto receivers of vehicles such as vans, pickup trucks, automobiles and the like. The step plate assembly provides horizontal surface serving as a step with a flat surface where the step plate assembly is an integral part of a traditional hitch bar with a hitch ball. In addition the step plate assembly is easy to remove or attach to the receiver bar. Because the step plate assembly, when the step plate is in a vertical position, allows for coupling the trailer hitch to the hitch ball and does not obstruct motion of the trailer tongue when in tow, the step plate assembly provides functionality not previously available with receiver assemblies.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A step plate assembly for attachment to a hitch bar of a hitch assembly where the hitch bar has a tongue for holding with a hitch-ball nut, a hitch ball with a shaft, the step plate assembly comprising:
   a support frame having a horizontally oriented bottom side with an attachment hole for attachment to a bottom side of the tongue with the hitch ball and hitch-ball nut, the support frame further having a left side and a right side extending vertically upward and perpendicular to the bottom side;
   a pivot plate, the pivot plate being pivotally mounted to the left and right side of the support frame; and
   a tread plate attached to the pivot plate, where the tread plate serves as a step when horizontally positioned and where the tread plate may be rotated upwardly to a vertical position for access to the hitch ball.

2. The step plate assembly of claim 1 wherein the support frame has at least one anti-rotation bar adapted to make contact with a vertical side of the tongue of the receiver bar.

3. The step plate assembly of claim 1 wherein the pivot plate is mounted to the support frame with one or more bolts.

4. The step plate assembly of claim 1 wherein the left and right sides of the support frame are notched to allow for unobstructed movement of a trailer hitch.

5. The step plate assembly of claim 1 wherein the tread plate is attached to the pivot plate with one or more screws.

* * * * *